United States Patent
Lee

(10) Patent No.: US 7,409,282 B2
(45) Date of Patent: *Aug. 5, 2008

(54) LOCATION INFORMATION SHARING METHOD BASED ON WIRED AND WIRELESS INTERNET USING LOCATION ID

(75) Inventor: Sang Zee Lee, Daejeon (KR)

(73) Assignee: GG21., Ltd, Doejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/542,251

(22) PCT Filed: Jan. 20, 2003

(86) PCT No.: PCT/KR03/00120

§ 371 (c)(1),
(2), (4) Date: Jul. 15, 2005

(87) PCT Pub. No.: WO2004/066662

PCT Pub. Date: Aug. 5, 2004

(65) Prior Publication Data

US 2006/0058942 A1    Mar. 16, 2006

(51) Int. Cl.
*H04Q 7/38* (2006.01)
*G08G 1/12* (2006.01)
*G06F 17/00* (2006.01)

(52) U.S. Cl. .................. 701/93; 701/207; 701/211; 709/201

(58) Field of Classification Search ............ 701/93, 701/200, 207, 211; 709/201, 203, 217, 218
See application file for complete search history.

(56) References Cited

U.S. PATENT DOCUMENTS

| | | | |
|---|---|---|---|
| 6,122,520 A * | 9/2000 | Want et al. | 455/456.2 |
| 6,487,495 B1 * | 11/2002 | Gale et al. | 701/209 |
| 6,687,746 B1 * | 2/2004 | Shuster et al. | 709/223 |
| 2002/0173981 A1 * | 11/2002 | Stewart | 705/1 |
| 2004/0181559 A1 * | 9/2004 | Lee et al. | 707/201 |

* cited by examiner

*Primary Examiner*—Tan Q Nguyen
(74) *Attorney, Agent, or Firm*—Dinsmore & Shohl LLP

(57) ABSTRACT

Disclosed is a location information sharing method based on wired and wireless internet using location ID. The location information sharing method is characterized by: inputting the location information including a location coordinate and a location ID corresponding to the location coordinate through one or more wired and wireless Internet terminals to register the location information to one or more location information domain servers; searching the registered location information after the terminal is connected to the location information domain servers corresponding to the location information when user selects the corresponding location ID to request the location information if the location ID is transferred or received between the wired and wireless Internet terminals or if the location ID contained in various documents is inputted; and transmitting the location information to the wired and wireless Internet terminal requesting the location information. The method can indicate the searched location information on an electronic map or perform a navigation function for guidance of road by designating the location information as a destination.

5 Claims, 4 Drawing Sheets

LOCATION INFORMATION SHARING METHOD BASED ON WIRED AND WIRELESS INTERNET USING LOCATION ID

TECHNICAL FIELD

The present invention relates to a location information sharing method based on wired and wireless internet using location ID(Identification). More particularly, the present invention relates to a location information sharing method based on wired and wireless internet using location ID, which can input location information including a location coordinate and a location ID corresponding to the location coordinate through a wired and wireless Internet terminal to register the inputted location ID into one or more location information domain servers, share the registered location ID between the wired and wireless Internet terminals, and search and utilize location information corresponding to the location ID.

BACKGROUND ART

Recently, with an increase in the demand for using an Internet, products of various kinds combining a wired and wireless Internet function and a GPS(Global Positioning System) function have been developed and utilized. Additionally, the GPS function is also embedded in mobile telephones. According to the above current, application fields of location information is increasing, and especially, services for providing location information to or through Internet terminals have been increased rapidly. In general, to provide a location information service through the Internet terminals, a method that searches a specified location by utilizing an identifier capable of representing the location to be searched, such as an address, a trade name, a telephone number, a zip code, or others, and indicates the searched result on an electronic map has been used mainly.

However, the conventional method for providing the location information has several problems that it is occasionally impossible to search a desired location at places where there is no identifier, such as mountains, seas, or others, and that it is inconvenient in use because a user must find a desired trade name using additional information, such as an address, in the case where there are lots of the same trade names even though it is possible to search. Furthermore, the conventional method for providing location information has another problem that it is difficult to apply single software because the addresses are formed in different way by countries. Especially, in case of Korean addresses based on lot numbers, the conventional method for providing location information has a restriction that one position cannot be indicated by address, because the lot numbers represent not a spot location but a field location.

Moreover, the conventional method for providing the location information has a further problem that it is difficult to share location information databases in the case where service providers provide services through their own software and data format in a state that there is no standardized international format for indicating the same location information or in the case where the trade names stored in the databases by the service providers are different from one another.

Additionally, the conventional method for providing location information has other problems that it is difficult to share location information because the location information through the Internet terminal is transferred in an image type after being copying from a map view screen or in a text type for explaining the location. Furthermore, the conventional method for providing location information can not inform easily and simply the specific location using the location ID, and perform a navigation function by indicating the corresponding location or utilizing as location information of the user's destination using the received location ID without reinput of the same location ID through the Internet terminal receiving the location ID.

DISCLOSURE OF INVENTION

Accordingly, the present invention has been made in view of the problems, and an object of the present invention is to provide a location information sharing method based on wired and wireless internet using location ID, which can input location information including a location coordinate and a location ID corresponding to the location coordinate through a wired and wireless Internet terminal to register the inputted location ID into one or more location information domain servers, share the registered location ID between the wired and wireless Internet terminals, and search and utilize location information corresponding to the location ID.

Another object of the present invention is to provide a location information sharing method based on wired and wireless internet using location ID, which can indicate the location information on an electronic map after searching the location information, and perform a navigation function by designating the location information as a destination when selecting the location ID received between the wired and wireless Internet terminals or the location ID from various documents including the location ID.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages, and according to an aspect of the invention, there is provided a location information sharing method based on wired and wireless internet using location ID, which is characterized by inputting the location information including a location coordinate and a location ID corresponding to the location coordinate through one or more wired and wireless Internet terminals to register the location information to one or more location information domain servers; searching the registered location information after the terminals are connected to the location information domain servers corresponding to the location information when user selects the corresponding location ID to request the location information if the location ID is transferred or received between the wired and wireless Internet terminals or if the location ID contained in various documents is inputted; and transmitting the location information to the wired and wireless Internet terminal requesting the location information.

The location information sharing method based on wired and wireless internet using location ID includes the steps of: checking whether or not the location information is registered, and registering the location information if not registered; inputting the location ID through the wired and wireless terminals if the location information is registered, and transmitting the location information to other wired and wireless Internet terminals; selecting the received location ID by the wired and wireless Internet terminal of a receiving side to request the location information; automatically connecting to the corresponding location information domain server, and searching the registered location information through the location ID; and checking the searched result, and transmitting the searched location information to the wired and wireless Internet terminal requesting the location information.

It is preferred that the location information sharing method based on wired and wireless internet using location ID further includes the step of indicating the searched location information on an electronic map of the wired and wireless Internet terminal.

It is preferred that the location information sharing method based on wired and wireless internet using location ID further includes the step of performing a navigation function by designating the searched location information as a destination.

It is preferred that the location information sharing method based on wired and wireless internet using location ID further includes the step of transmitting an error code of search failure to the wired and wireless Internet terminal requesting the location information if the searched result is not performed normally.

The location information sharing method based on wired and wireless internet using location ID includes the steps of: checking whether or not the location information is registered, and registering the location information if not registered; inputting the location ID into contents of various document of the wired and wireless Internet terminal or loading the various document containing the location ID, if the location information is registered; checking a format of the location ID if the location ID is inputted into the various documents, and automatically setting the location ID by smart tag or other similar way; selecting the location ID to request the location information; connecting to the corresponding location information domain server, and searching the registered location information through the location ID; and transmitting the searched location information to the wired and wireless Internet terminal requesting the location information.

It is preferred that the various documents include documents made by a PIM(Personal Information Management) software having an address book, a calendar, a note pad, and others, documents made by writing function in bulletin board on Web-pages, documents made by various document writing softwares or editors, documents written as an E-mail, documents made by messengers, and documents made by a SMS (Short Message Service) of cellular phones.

It is preferred that the step of registering the location information includes the steps of: inputting a location coordinate desired to register through the wired and wireless Internet terminals; inputting the location ID corresponding the location coordinate; connecting to the location information domain servers corresponding to the location ID, and checking whether or not the location ID is duplicated; and registering the location ID into the corresponding location information domain server.

It is preferred that in the step of inputting the location coordinate, if the wired and wireless Internet terminal includes a GPS(Global Positioning System) receiver, the present location coordinate is automatically inputted through the GPS receiver.

It is preferred that in the step of inputting the location coordinate, a value of the location coordinate is directly inputted in letters or figures through the wired and wireless Internet terminal if the user knows the value of the location coordinate, and the location is indicated on the electronic map on the wired and wireless Internet terminal by using an address, a trade name, a telephone number or an index map and the value of the location coordinate of the location designated on the electronic map by the user is automatically inputted if the user does not know the value of the location coordinate.

It is preferred that the location ID is formed by combination of a user ID determined by each location by the user when the location information is registered, a location ID symbol selected to discriminate from an E-mail ID symbol, and a location information domain server address for storing and managing the registered location information.

It is preferred that the location ID symbol is #, !, $, %, & or *.

It is preferred that the wired and wireless Internet terminals are computers, notebooks, cellular phones, PDAs(Portable Digital Assistants), GPS terminals and telematics terminals capable of wired or wireless Internet connection.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which.

BEST MODE FOR CARRYING OUT THE INVENTION

Figure 1:
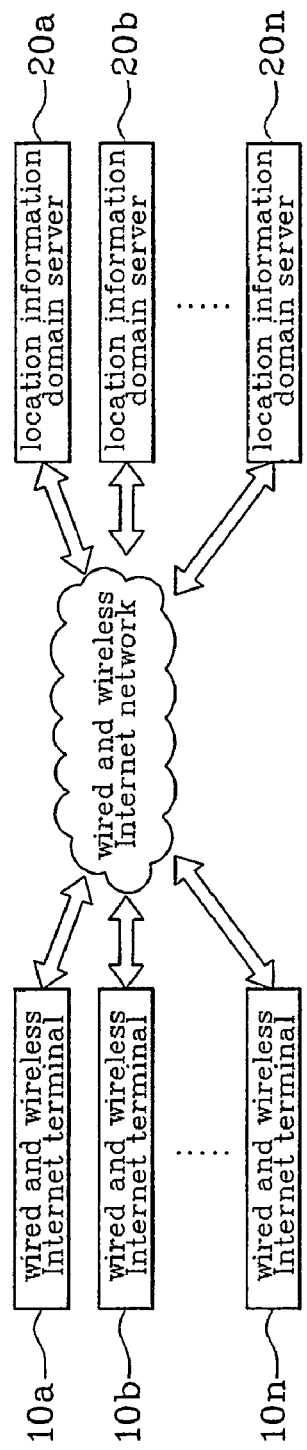
FIG. 1 is a system block diagram for briefly explaining a method for sharing location information based on wired and wireless Internet using location ID according to the present invention.

The present invention will now be described in detail in connection with preferred embodiments with reference to the accompanying drawings. For reference, like reference characters designate corresponding parts throughout several views.

FIG. 1 is a system block diagram for briefly explaining a method for sharing location information based on wired and wireless Internet using location ID according to the present invention.

Figure 4:
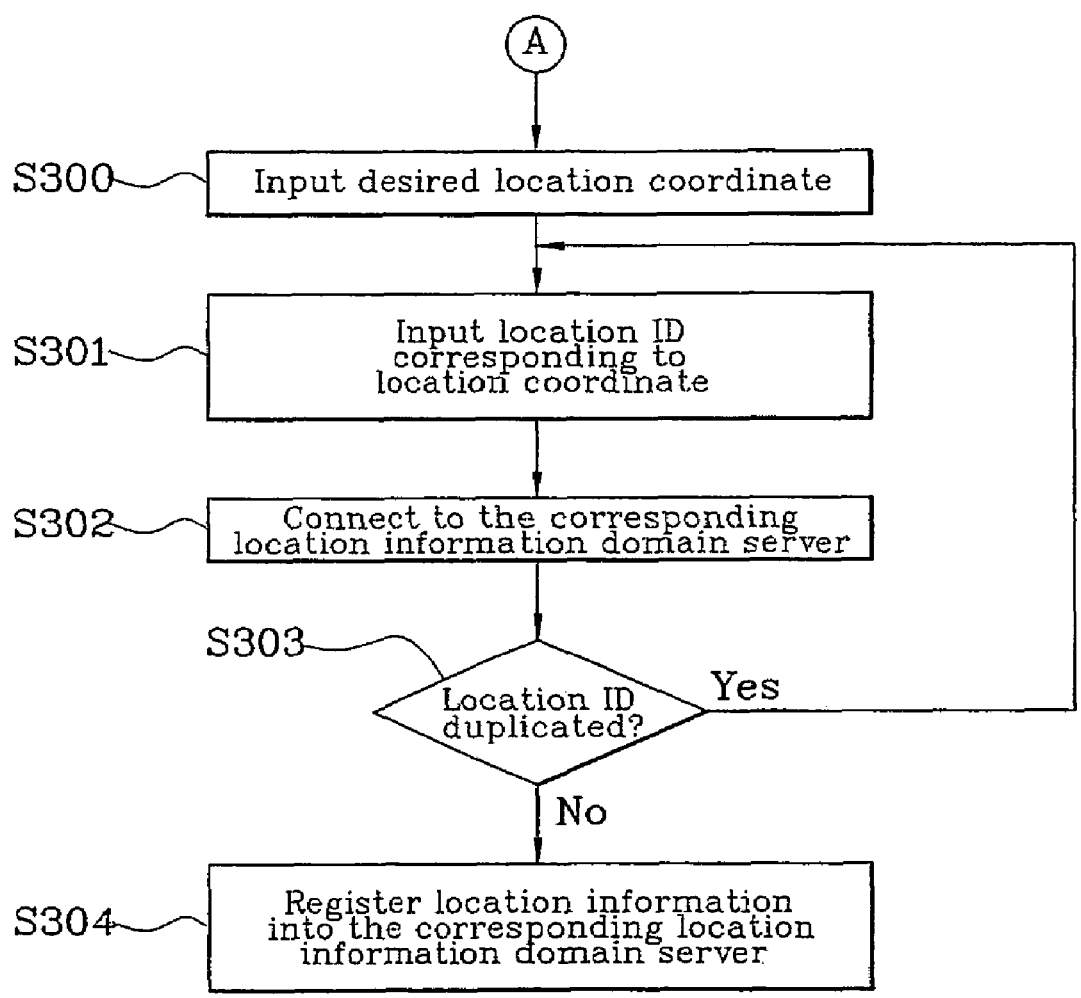
FIG. 4 is a flow chart showing a process for registering location information according to the present invention.

First, users input location information including a desired location coordinate and a location ID(Identification) corresponding to the location coordinate using one or more wired or wireless Internet terminals 10a to 10n, and register the location information into one or more location information domain servers 20a to 20n (see a flow chart of FIG. 4). Here, it is preferable that the format of the location ID inputted through the wired and wireless Internet terminals 10a to 10n is combination of a user ID determined by each location by the user when the location information is registered, a location ID symbol selected to discriminate from an E-mail ID symbol, and a location information domain server address for storing and managing the registered location information.

That is, the location ID symbol may be #, !, $, %, &, * or others excepting @, which is the E-mail ID symbol. For an example, in the case where the user wants to decide the user ID corresponding to the desired location coordinate as "szeelee" and register the location information including the location coordinate and the location ID into a location information domain server of www.gg21.co.kr, the location ID may be indicated as "szeelee#gg21.co.kr".

After the location information including the location coordinate and the location ID is registered into the location information domain servers 20a to 20n, in the case where the location ID is transmitted and received through the wired and wireless Internet terminals 10a to 10n or included in various documents, when the user selects the location ID, the user's terminal is connected to the location information domain servers 20a to 20n in which the location ID is registered, the location information corresponding to the location ID is searched and transmitted to the wired and wireless Internet terminal 10a to 10n requesting the location information, so that the location information is indicated on an electronic map or can perform a navigation function by designating the location information as a destination.

It is preferable that the wired and wireless Internet terminals 10a to 10n include computers, notebooks, cellular phones, PDAs(Personal Digital Assistants), GPSs(Global Positioning Systems) and telematics terminals. The location information domain servers 20a to 20n are wired or wireless Internet servers. Additionally, it is preferable that the location information domain servers 20a to 20ninclude database systems and/or database management systems (not shown in drawings) for storing and managing the location information including the location coordinate and the corresponding location ID inputted from the users' wired and wireless Internet terminals 10a to 10n.

Figure 2:
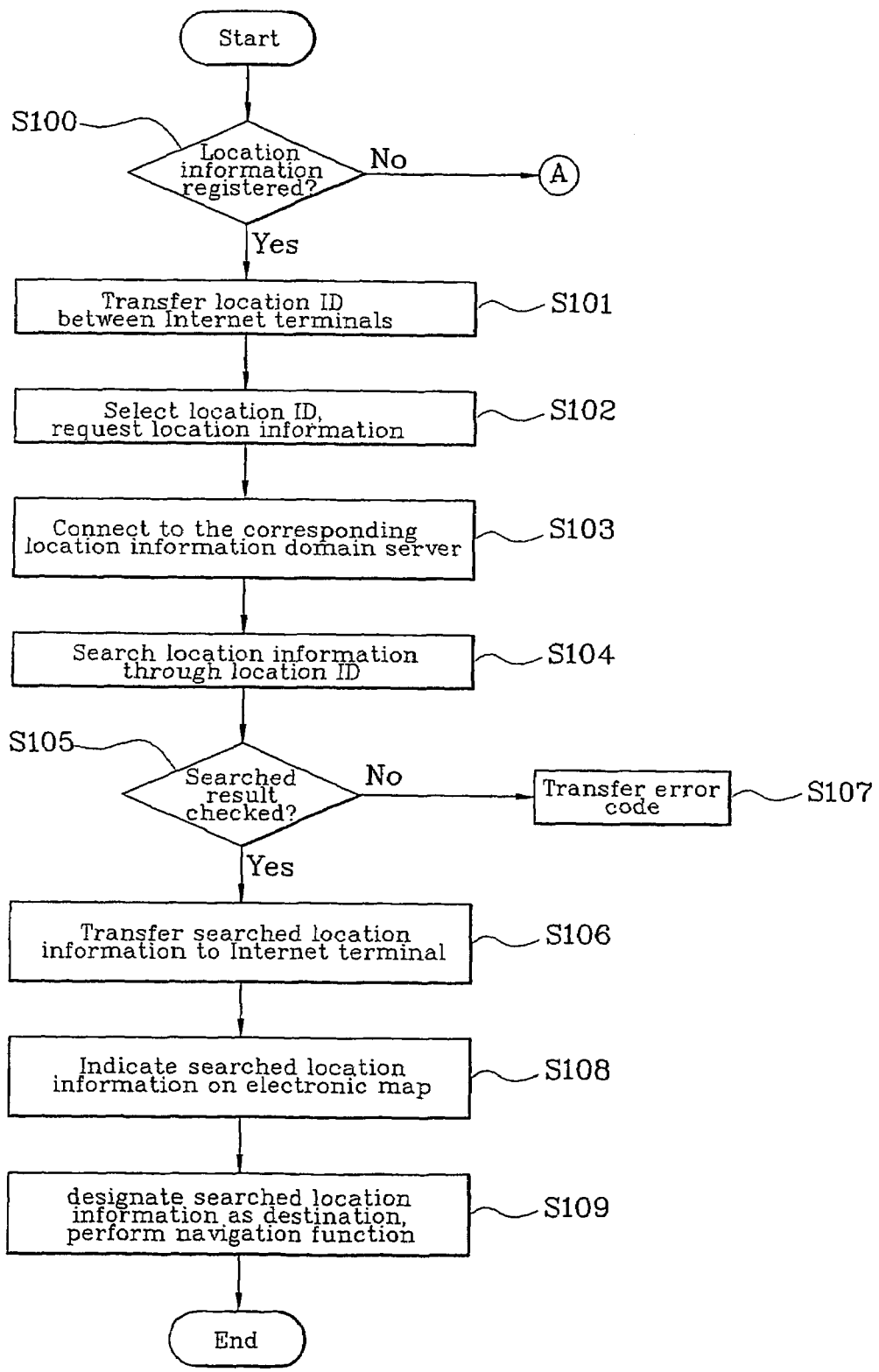
FIG. 2 is a flow chart for showing a method for sharing location information based on wired and wireless Internet using location ID according to a preferred embodiment of the present invention.

FIG. 2 is a flow chart for showing the method for sharing location information based on wired and wireless Internet using location ID according to a preferred embodiment of the present invention.

First, the user checks whether or not a desired location information is registered (S100), and registers the desired location information if not registered. A process for registering the location information will be described referring to FIG. 4. That is, the user inputs location coordinate, to be registered, through the wired and wireless Internet terminals 10a to 10n (S300). At this time, if the wired and wireless Internet terminals 10a to 10n include the GPS receiver, the present location coordinate received through the GPS receiver are inputted automatically. The user directly inputs a value of the location coordinate in letters or figures through the wired and wireless Internet terminals 10a to 10n if the user knows the value of the location coordinate to be registered. If the user does not know the value of the location coordinate, when the user designates the desired location or area, which is indicated on the electronic map on the wired and wireless Internet terminals 10a to 10n using an address, a trade name, a telephone number or an index map, the location coordinate corresponding to the location designated by the user are inputted automatically.

When the location coordinate is inputted, the user inputs the location ID corresponding to the location coordinate in the same way as in FIG. 1 (S301). When the location information including the location coordinate and the location ID corresponding to the location coordinate is transferred to the location information domain servers 20a to 20n corresponding to the location ID, the terminals are connected to the location information domain servers 20a to 20b (S302). After that, it is checked whether or not the location ID is duplicated (S303), and if not, the location ID is registered to the corresponding location information domain server 20a to 20n (S304). Of course, if the location ID is duplicated (namely, if the user ID corresponding to the location coordinate is duplicated), duplication message is transmitted to the wired and wireless Internet terminals 10a to 10n. Then, the users must return to the step 301, and inputs a new location ID.

After the location information is registered, when the users input the location ID registered to the location information domain servers 20a to 20n through the wired an wireless Internet terminals 10a to 10n, the location ID is transmitted to other wired and wireless Internet terminals 10a to 10n, so that a number of wired and wireless Internet terminals 10a to 10n can transmit and receive the location ID between them (S101). The wired and wireless Internet terminal 10a to 10n of a receiving side selects the received location ID to request the location information (S102). The location ID can be selected by cursor control units of various types, such as a mouse of the wired and wireless Internet terminals 10a to 10n, a button of all directions, an input pen of a touch screen, a track ball, or others.

When the user selects the location ID to request the location information, the terminal is automatically connected to the corresponding location information domain server 20a to 20n in which the location information is registered (S103), and searches the registered location information through the location ID (S104). The user checks the searched result (S105), and if the search is carried out normally, the searched location information is transmitted to the wired and wireless Internet terminal 10a to 10n requesting the location information (S106). If the search is failed, an error code of cause of the search failure is transmitted to the wired and wireless Internet terminal 10a to 10n requesting the location information (S107). The searched location information includes the location ID and the location coordinate corresponding to the location ID.

Furthermore, the searched location information may be indicated as a symbol on the electronic map through a GIS (Geographical Information System) software of the wired and wireless Internet terminals 10a to 10n (S108), or perform the navigation function by designating the searched location information as the destination (S109).

Figure 3:
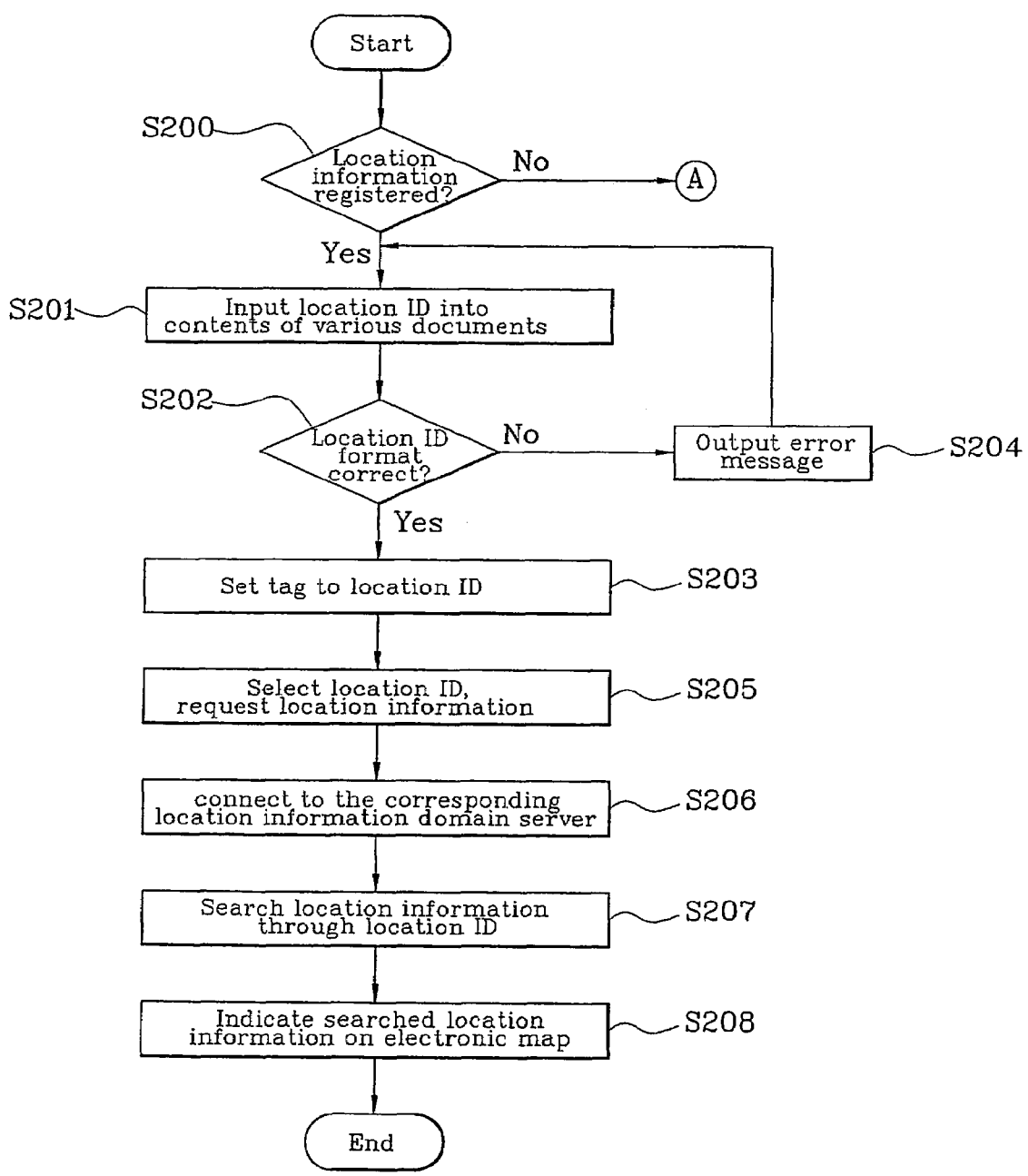
FIG. 3 is a flow chart for showing a method for sharing location information based on wired and wireless Internet using location ID according to another preferred embodiment of the present invention.

FIG. 3 is a flow chair for showing the method for sharing location information based on wired and wireless Internet using location ID according to another preferred embodiment of the present invention.

First, as in the embodiment of FIG. 2, the user checks whether or not the location information is registered (S200), and registers the location information if the location information is not registered. The process for registering the location information is the same as in FIG. 4. After the location information is registered, the user inputs the location ID into contents of various documents of the wired and wireless Internet terminals 10a to 10n (S201), or loads various documents containing the location ID. As described above, the location ID is inputted as the format (for example, "szeeless#gg21.co.kr"), in which the user ID, the location ID symbol and the location information domain server address are combined. The various documents include documents made by a PIM(Personal Information Management) software having an address book, a calendar, a note pad, and others, documents made by writing function in bulletin board on Web-pages, documents made by various document writing machines or editors, documents made as an E-mail, documents made by messengers, and documents made by a SMS (Short Message Service) of cellular phones.

When the location ID is inputted in the various documents, the format of the location ID is checked (S202). After that, the location ID has an underline automatically formed by smart tag or other similar way and is converted to a predetermined color to allow the user to easily discriminate the location ID (S203). If the location ID does not conform to the predetermined form, an error message is outputted (S204), and the step is returned to the step 201.

As described above, when the user selects the location ID to request the location information corresponding to the location ID (S205) after inputting the location ID into the contents of the various documents or loading the various documents containing the location ID, the terminal is connected to the corresponding location information domain server 20a to 20n (S206), and searches the registered location information through the location ID (S207). The searched location information is transmitted to the wired and wireless Internet terminal 10a to 10n requesting the location information, and can be indicated as a symbol on the electronic map through the GIS software (S208). The searched location information includes the location ID and the location coordinate corresponding to the location ID.

The step 207 includes a searched result checking step for checking whether or not the search of the registered location information is carried out normally, and if the search is not carried out normally, the error code of the cause of failure is transmitted to the wired and wireless Internet terminal 10a to 10n requesting the location information.

As described in the embodiment of FIG. 2, the location ID can be selected by cursor control units of various types, such as a mouse of the wired and wireless Internet terminals 10a to 10n, a button of all directions, an input pen of a touch screen, a track ball, or others. Furthermore, the searched location information may perform the navigation function for guidance of the road by being designated as a destination.

As described above, according to the embodiments of the present invention, through the steps of inputting the location information including the location coordinate and the location ID corresponding to the location coordinate through the wired and wireless Internet terminals, registering the location information to one or more location information domain servers, commonly sharing the registered location ID between the wired and wireless Internet terminals, and automatically searching the location information corresponding to the location ID when the user selects the location ID received between the wired and wireless Internet terminals or the location ID contained in various documents, the searched location information is received and indicated on the electronic map and can perform the navigation function for guidance of road.

INDUSTRIAL APPLICABILITY

As described above, by the method for sharing location information based on wired and wireless Internet using location ID, the location information including the location coordinate and the location ID corresponding to the location coordinate is inputted through the wired and wireless Internet terminals, registered to one or more location information domain servers, and commonly shared between the wired and wireless Internet terminals, so that the users can search and utilize the location information corresponding to the location ID.

Additionally, according to the present invention, when the user selects the location ID received between the wired and wireless Internet terminals or the location ID contained in various documents, the terminal is automatically connected to the location information domain servers. Therefore, the present invention can search the location information through the location ID, receive and indicate the searched location information on the electronic map, and perform the navigation function by designating the location information as the destination.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A location information sharing method based on wired and wireless internet using location identification (ID), the method is characterized by:
    writing a location ID in a content of a document, wherein the location ID comprises a UserID and DomainName separated by a separator symbol;
    searching a registered location information utilizing a location ID linked to a URL, wherein the URL includes the UserID and DomainName as parameters, on one of a plural of location information domain servers, wherein a wired or wireless terminal connects with a web site corresponding to the URL;
    requesting the location information domain server to search a location information corresponding to the location ID;
    transmitting the location information including a coordinate value searched by the location ID from the location information domain server to the wired or wireless terminal requesting the location information; and
    performing application functions, wherein the application functions include viewing a map around a location coordinate contained in the location information corresponding to location ID on the wired or wireless terminal.

2. The method according to claim 1, wherein the method further comprising the step of performing a navigation function of the wired or wireless terminal with a positioning system by designating a location coordinate contained in the location information corresponding to the location ID as a destination.

3. The method according to claim 1, wherein the separator symbol in said location ID comprises a #, !, $, %, & or*.

4. The method according to claim 1, wherein the wired or wireless terminals are computers, notebooks, cellular phones, PDAs (Portable Digital Assistants), GPS terminals and telematics terminals capable of wired or wireless connection.

5. The method of claim 1, wherein the document comprises documents from a personal information management software, documents from an electronic bulletin board, documents from word processing software, documents from presentation software, documents from a spreadsheet software, documents from electronic mail, documents from messaging programs, and/or documents from short message service of cellular phones.

* * * * *